(No Model.) 2 Sheets—Sheet 1.

C. W. MOORE.
COIN CONTROLLED TESTING MACHINE.

No. 540,595. Patented June 4, 1895.

WITNESSES:
H. S. Harrison
Rollin Abell

INVENTOR
C. W. Moore
by Wright Brown & Quinby
Attys.

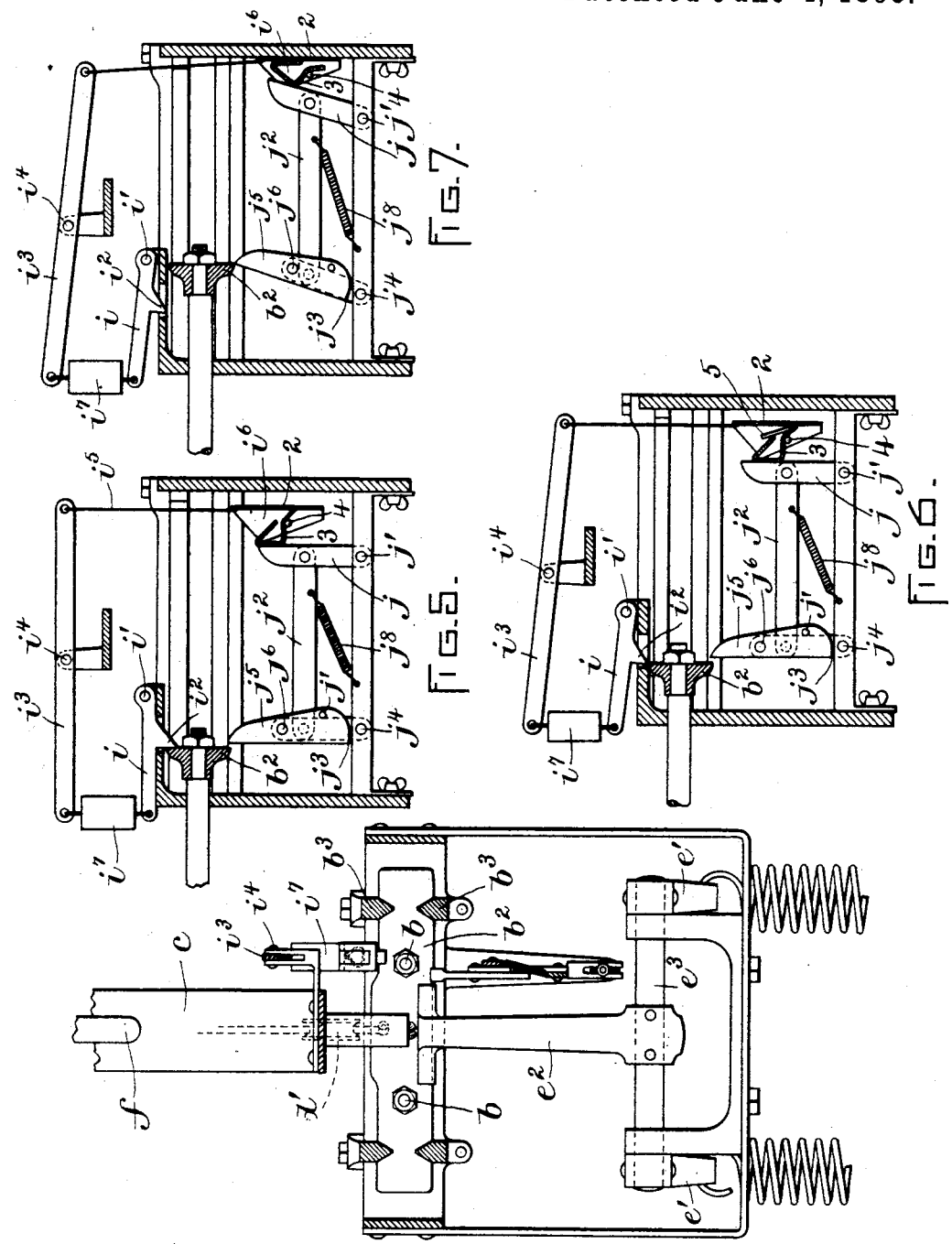

UNITED STATES PATENT OFFICE.

CLARENCE W. MOORE, OF PEABODY, MASSACHUSETTS, ASSIGNOR OF TWO-THIRDS TO ARTHUR W. CLARK AND PERLEY P. KING, OF SAME PLACE.

COIN-CONTROLLED TESTING-MACHINE.

SPECIFICATION forming part of Letters Patent No. 540,595, dated June 4, 1895.

Application filed April 1, 1895. Serial No. 544,014. (No model.)

*To all whom it may concern:*

Be it known that I, CLARENCE W. MOORE, of Peabody, in the county of Essex and State of Massachusetts, have invented certain new and useful Improvements in Coin-Controlled Testing-Machines, of which the following is a specification.

This invention relates to coin-controlled machines for testing the force of the human arm in delivering a blow, and it has for its object to provide a simple, durable, and effective machine, comprising a slide adapted to receive the blow, an indicator adapted to be projected by the movement of the slide caused by a blow delivered upon it, and coin-controlled mechanism for locking said slide and indicator so that there can be no operation without the previous insertion of a coin.

Figure 2:
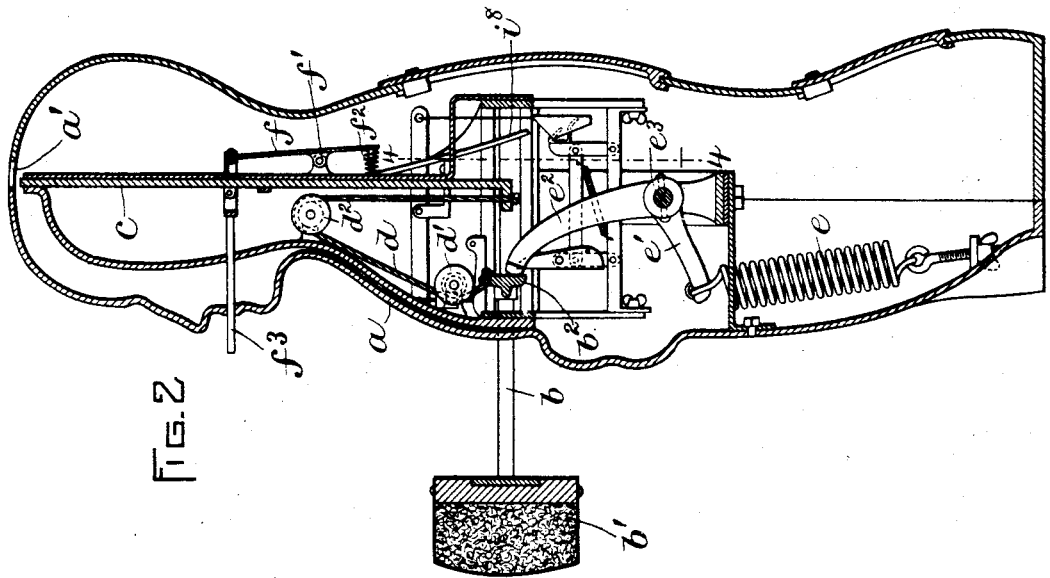
Figure 3:
Figure 1:
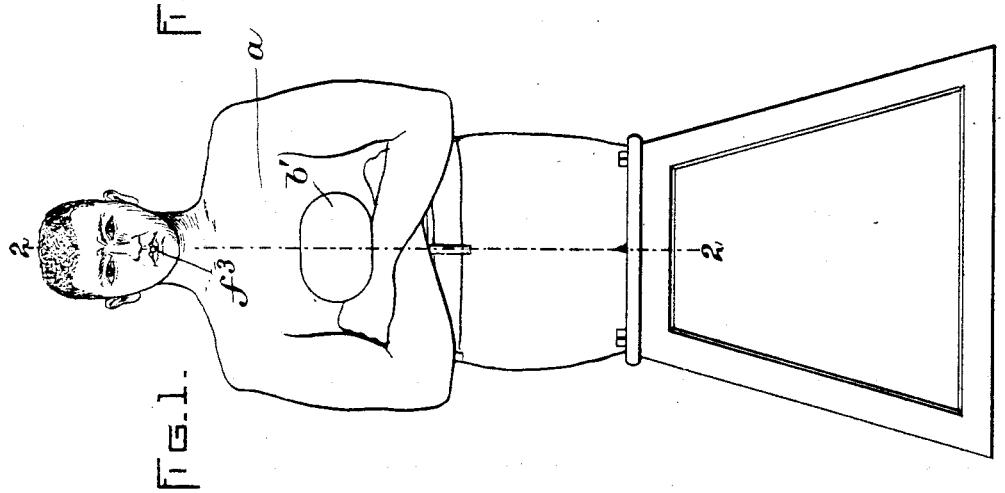

Of the accompanying drawings, forming a part of this specification, Figure 1 represents a front view of my improved mechanism. Fig. 2 represents a section on line 2 2 of Fig. 1. Fig. 3 represents a front view of a portion of the casing, showing the indicator projected. Fig. 4 represents a section on line 4 4 of Fig. 2; and Figs. 5, 6, and 7 represent sectional views showing the slide and coin-controlled mechanisms in the positions they occupy before inserting a coin, after inserting a coin, and after the slide has been forced in.

In the drawings, $a$ represents a supporting frame or casing for the operative parts hereinafter described, said casing being preferably formed to represent a human figure.

$b\ b$ represent slides fitted to move in guides in the front of the casing, their outer ends being connected by a padded head $b'$ to receive a blow from the fist of a person desiring to test his muscular force, while their inner ends are connected by a cross-head $b^2$ fitted to move on V-shaped guides or ways $b^3$ within the casing.

Within the casing is a vertically movable indicator $c$, which is a bar fitted to move in guides in the casing, the latter having an aperture $a'$ through which the indicator may be projected. The indicator is connected by a cord $d$ with the cross-head $b^2$, said cord being attached at its ends to the indicator and cross-head, as shown in Fig. 2, and passing over intermediate pulleys $d'\ d^2$, the arrangement being such that when the cross-head $b^2$ is forced inwardly the indicator will be projected a corresponding distance. When the indicator is thus raised or projected, it is held raised by a dog $f$, which is pivoted at $f'$ to a fixed support in the casing and is held by a spring $f^2$ in contact with the indicator, and is adapted to support the latter by friction at any point to which it may be raised. A push-rod $f^3$ projecting through the front of the casing and engaged at its inner end with the dog $f$ serves to disengage the dog from the indicator and permit the latter to drop when the push-rod is pressed inwardly.

To oppose the inward movement of the slides $b$, I employ springs $e\ e$ attached at their lower ends to the casing and at their upper ends to the arms $e'\ e'$ affixed to a rock-shaft $e^3$. Said rock-shaft has an arm $e^2$ bearing against the cross-head $b^2$.

The cross-head $b^2$ is normally locked against inward movement by a coin-controlled locking mechanism constructed as follows:

$i$ represents a dog pivoted at $i'$ to the casing and provided with a tooth $i^2$ which normally engages the cross-head $b^2$ and prevents inward movement thereof. One end of the dog $i$ is connected with one arm of a lever $i^3$ which is pivoted at $i^4$ within the casing, its other arm being connected by a rod $i^5$ with a vertically movable coin-receptacle $i^6$, the latter being suspended by the rod $i^5$ from the lever $i^3$. The lever $i^3$ is so nearly counterbalanced by the dog $i$ and a weight $i^7$ on one of its arms and the coin-receptacle $i^6$ on its other arm that the weight of a coin deposited in the receptacle through a coin-chute $i^8$ will raise the dog, as shown in Fig. 6, thus releasing the cross-head $b^2$ and permitting it to be forced inwardly by a blow on the head $b'$. An inward movement of the cross-head releases the coin from the receptacle in the following manner: The coin-receptacle is composed of a body-portion 2, which is attached to the suspending rod $i^5$, and a portion 3 which is hinged at 4 to the body-portion and is formed so that its lower edge normally bears against the portion 2, the two parts collectively holding a coin 5 (Fig. 6) that may be deposited in the receptacle. When the portion 3 is displaced from its normal position, as shown in Fig. 7, its lower edge is separated from the portion 2 and permits the coin to drop into the bottom of the casing. The portion 3 is displaced by a lever $j$, which is pivoted at $j'$ to a fixed support and is connected by a rod $j^2$ to a lever $j^3$ pivoted at $j^4$ to the same support. To the lever $j^3$ is pivoted at $j^6$ a dog $j^5$ having a pin $j^7$ bearing against the rear edge of the lever $j^3$, said dog bearing on the cross-head $b^2$. The levers $j$ and $j^3$ and dog $j^5$ are normally held in the position shown in Figs. 5 and 6 by a spring $j^8$. When the cross-head $b^2$ is forced inwardly, it moves the dog $j^5$ and levers $j^3$ and $j$ to the position shown in Fig. 7, thus causing the lever $j$ to displace the portion 3 of the coin-receptacle and release the coin. When the coin is released, the dog $i$ drops and is in position to lock the cross-head $b^2$ when the latter returns to its starting position. Should the cross-head in moving inwardly pass over the dog $j^5$, said dog will yield to the return movement of the cross-head and re-engage the latter when the cross-head reaches its normal position.

The operation is as follows: A person desiring to test the force of his arm in delivering a blow first inserts a coin in the chute $i^3$ thus unlocking the cross-head $b^2$. He then strikes the padded head $b'$, driving the cross-head inwardly, and thus projecting the indicator a distance corresponding to the force of the blow, the indicator being held in its raised position by the dog $f$. The springs $e$ are extended by the force exerted, and afterward act to return the cross-head to its starting position, where it is again locked by the dog $i$. After the position of the indicator has been noted, the indicator is released by the push-rod $f^3$, and the machine is ready for the next operation.

I do not limit myself to the particular details of construction herein described and shown, as the same may be variously modified in many particulars without departing from the spirit of my invention.

For the sake of convenience, I hereinafter denominate the parts $b\ b$, $b'$, and $b^2$ a slide.

I claim—

1. A coin-controlled testing-machine comprising a casing, a slide movable in the casing and having an external head, means for yieldingly resisting the inward movement of the slide, coin-controlled mechanism for locking the slide, and an indicator connected with the slide and adapted to be projected from the casing by an inward movement of the slide.

2. A coin-controlled testing-machine comprising a casing, a slide movable in the casing and having an external head, means for yieldingly resisting the inward movement of the slide, coin-controlled mechanism for locking the slide, an indicator connected with the slide and adapted to be projected from the casing by an inward movement of the slide, means for securing the indicator at any point to which it may be projected, and means whereby the indicator may be released after its position has been noted.

3. A coin-controlled testing machine comprising a casing having an orifice in its upper portion, a slide movable in said casing and comprising an external padded head $b'$ and an internal cross-head $b^2$, fixed guides for said cross-head within the casing, a rock-shaft journaled in the casing and provided with an arm $e^2$ bearing against said cross-head and with arms $e'\ e'$, springs connected to the arms $e'$ and holding the arm $e^2$ yieldingly against the cross-head, a vertically movable indicator mounted in guides in the casing and movable through an orifice therein, a flexible connection between said indicator and the cross-head $b^2$ through which the indicator is raised when the cross-head is moved inwardly, a dog which yieldingly engages the indicator and holds it at any point to which it may be raised, means for displacing the dog to release the indicator, and coin-controlled mechanism for locking said cross-head.

In testimony whereof I have signed my name to this specification, in the presence of two subscribing witnesses, this 25th day of March, A. D. 1895.

CLARENCE W. MOORE.

Witnesses:
WALTER PRAY,
C. F. BROWN.